United States Patent
Ahn et al.

(10) Patent No.: US 11,797,221 B2
(45) Date of Patent: *Oct. 24, 2023

(54) METHOD OF OPERATING STORAGE DEVICE FOR IMPROVING QOS LATENCY AND STORAGE DEVICE PERFORMING THE SAME

(71) Applicant: SAMSUNG ELECTRONICS CO., LTD., Suwon-si (KR)

(72) Inventors: Sumin Ahn, Incheon (KR); Jinseok Kim, Seoul (KR); Jungjeong Jo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

This patent is subject to a terminal disclaimer.

(21) Appl. No.: 17/473,062

(22) Filed: Sep. 13, 2021

(65) Prior Publication Data

US 2021/0405916 A1 Dec. 30, 2021

Related U.S. Application Data

(63) Continuation of application No. 16/810,478, filed on Mar. 5, 2020, now Pat. No. 11,119,693.

(30) Foreign Application Priority Data

Jul. 29, 2019 (KR) .......... 10-2019-0091549

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 12/0246; G06F 3/061; G06F 3/0659
See application file for complete search history.

(56) References Cited

U.S. PATENT DOCUMENTS 6,370,628 B2 4/2002 Beppu
8,271,692 B1 9/2012 Dinh et al.
(Continued)

FOREIGN PATENT DOCUMENTS

JP 2019-003391 1/2019

OTHER PUBLICATIONS

Notice of Allowance dated May 7, 2021 in corresponding U.S. Appl. No. 16/810,478.

*Primary Examiner* — Jane W Benner
(74) *Attorney, Agent, or Firm* — F. Chau & Associates, LLC

(57) ABSTRACT

In a method of operating a storage device, a first throughput, for transmitting a plurality of write command completion responses to an external host device, is set to an initial value. The plurality of write command completion responses represent an execution of a plurality of write commands received from the external host device. The plurality of write commands are executed. The plurality of write command completion responses are transmitted to the external host device based on the first throughput that is set to the initial value. A plurality of write data are internally stored based on the plurality of write commands. A second throughput, associated with an operation of internally storing the plurality of write data, is monitored during a predetermined first time interval. The first throughput is changed based on the second throughput that is monitored during the predetermined first time interval.

15 Claims, 15 Drawing Sheets

(56) References Cited

U.S. PATENT DOCUMENTS

| | | |
|---|---|---|
| 9,086,808 B2 | 7/2015 | Itoh |
| 9,928,906 B2 | 3/2018 | Hanyu et al. |
| 10,261,695 B2 | 4/2019 | Benisty et al. |
| 10,268,420 B2 | 4/2019 | Alcantara et al. |
| 2010/0077096 A1* | 3/2010 | Philip ................... G06F 16/182 709/233 |
| 2012/0066439 A1* | 3/2012 | Fillingim .............. G06F 3/0653 711/E12.008 |
| 2013/0159610 A1 | 6/2013 | Kawamura |
| 2016/0266794 A1 | 9/2016 | Ishibashi |
| 2021/0034282 A1 | 2/2021 | Ahn et al. |

\* cited by examiner

METHOD OF OPERATING STORAGE DEVICE FOR IMPROVING QOS LATENCY AND STORAGE DEVICE PERFORMING THE SAME

CROSS-REFERENCE TO RELATED APPLICATION

This application is a continuation application of U.S. patent application Ser. No. 16/810,478 filed Mar. 5, 2020, which claims priority under 35 U.S.C. § 119 to Korean Patent Application No. 10-2019-0091549, filed on Jul. 29, 2019 in the Korean Intellectual Property Office (KIPO), the disclosures of which are incorporated by reference herein in their entirety.

TECHNICAL FIELD

Exemplary embodiments of the inventive concept relate generally to semiconductor integrated circuits, and more particularly, to methods of operating storage devices for improving quality of service (QoS) latency, and storage devices performing the methods.

DISCUSSION OF RELATED ART

A storage system includes a host device and a storage device. The storage device may be a memory system including a memory controller and a memory device, or including only a memory device. In the storage system, the host device and the storage device are connected to each other via various interface standards such as, for example, universal flash storage (UFS), serial advanced technology attachment (SATA), small computer system interface (SCSI), serial attached SCSI (SAS), embedded multimedia card (eMMC), etc.

Quality of service (QoS) is the description or measurement of the overall performance of a service, such as a computer network or a cloud computing service, particularly, the performance seen by users of the network. To quantitatively measure QoS, several related aspects of the network service are often considered, such as bit rate, throughput, transmission delay, availability, jitter, etc.

SUMMARY

According to an exemplary embodiment of the inventive concept, in a method of operating a storage device, a first throughput, for transmitting a plurality of write command completion responses to an external host device, is set to an initial value. The plurality of write command completion responses represent an execution of a plurality of write commands received from the external host device. The plurality of write commands are executed. The plurality of write command completion responses are transmitted to the external host device based on the first throughput that is set to the initial value. A plurality of write data are internally stored based on the plurality of write commands. A second throughput, associated with an operation of internally storing the plurality of write data, is monitored during a predetermined first time interval. The first throughput is changed based on the second throughput that is monitored during the predetermined first time interval.

According to an exemplary embodiment of the inventive concept, a storage device includes a command queue, a command handler, a storage controller, and a plurality of memory blocks. The command queue queues a plurality of write commands received from an external host device. The command handler sets a first throughput, for transmitting a plurality of write command completion responses to the external host device, to an initial value, executes the plurality of write commands, and transmits the plurality of write command completion responses to the external host device based on the first throughput that is set to the initial value. The plurality of write command completion responses represent an execution of the plurality of write commands. The storage controller performs an operation of internally storing a plurality of write data based on the plurality of write commands, and monitors a second throughput associated with the operation of internally storing the plurality of write data during a predetermined first time interval. The plurality of memory blocks store the plurality of write data based on a control of the storage controller. The command handler changes the first throughput based on the second throughput that is monitored during the predetermined first time interval.

According to an exemplary embodiment of the inventive concept, in a method of operating a storage device that includes a command queue, a command handler, a storage controller, and a plurality of memory blocks, the command handler sets a first throughput, for transmitting a plurality of write command completion responses to an external host device, to a maximum value. The plurality of write command completion responses are associated with a plurality of write commands. The plurality of write commands, received from the external host device, are queued in the command queue. The command handler allocates the plurality of write commands to the plurality of memory blocks. The command handler generates the plurality of write command completion responses indicating that an operation of allocating the plurality of write commands is completed. The command handler transmits the plurality of write command completion responses to the external host device based on the first throughput that is set to the maximum value. The storage controller stores the plurality of write data in the plurality of memory blocks based on the plurality of write commands. The storage controller receives a plurality of write done signals indicating that an operation of storing the plurality of write data is completed. The storage controller monitors a second throughput for receiving the plurality of write done signals during a predetermined first time interval. The command handler decreases the first throughput to have a value equal to that of the second throughput when the monitored second throughput is less than the maximum value. The plurality of write command completion responses are temporarily stored in the command handler and transmitted to the external host device when a delay time elapses after the operation of allocating the plurality of write commands is completed.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
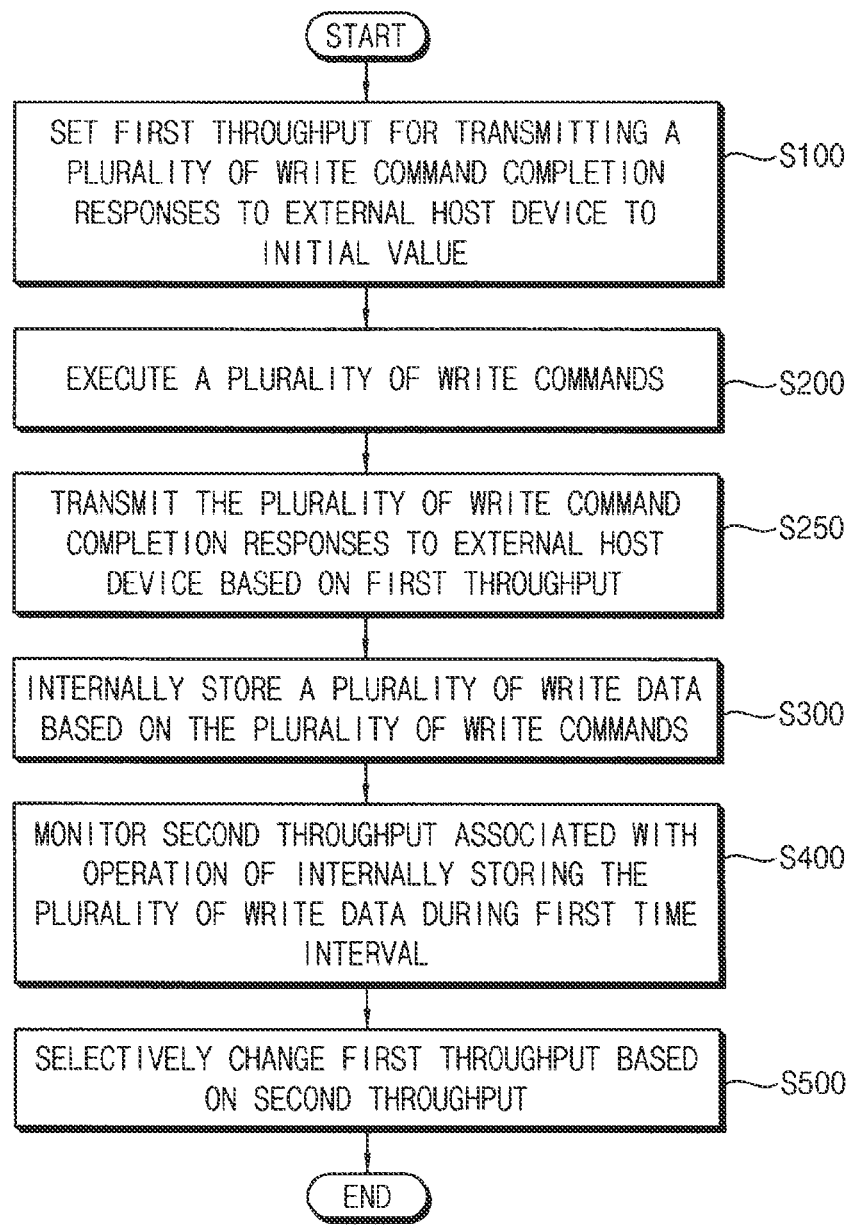
FIG. 1 is a flowchart illustrating a method of operating a storage device according to an exemplary embodiment of the inventive concept.

Exemplary embodiments of the inventive concept provide a method of operating a storage device capable of having improved or enhanced quality of service (QoS) latency.

Exemplary embodiments of the inventive concept also provide a storage device that performs the method capable of having improved or enhanced QoS latency.

Exemplary embodiments of the inventive concept will be described more fully hereinafter with reference to the accompanying drawings. Like reference numerals may refer to like elements throughout this application.

FIG. 1 is a flowchart illustrating a method of operating a storage device according to an exemplary embodiment of the inventive concept.

Referring to FIG. 1, a storage device according to an exemplary embodiment of the inventive concept includes a plurality of nonvolatile memories and a storage controller. The plurality of nonvolatile memories include a plurality of memory blocks that store data, and the storage controller controls operations of the plurality of nonvolatile memories. In addition, the storage device further includes a command queue for queuing commands and a command handler for executing the commands. Configurations of the storage device and a storage system including the storage device will be described with reference to FIG. 2.

In a method of operating the storage device according to an exemplary embodiment of the inventive concept, a first throughput for transmitting a plurality of write command completion responses to an external host device is set to an initial value or a default value (operation S100). The plurality of write command completion responses represent an execution of a plurality of write commands received from the external host device. For example, as will be described with reference to FIG. 6, the plurality of write command completion responses may indicate that an operation of allocating the plurality of write commands to the plurality of memory blocks is completed.

In exemplary embodiments of the inventive concept, the initial value may correspond to a maximum throughput of the storage device. In an initial operating time, a monitoring operation of operation S400 described below may not be performed, and a result or information of the monitoring operation may not exist. Since there is no significant problem in an operation of the storage device even if the first throughput is set to the maximum in the initial operating time, the first throughput may be set to correspond to the maximum throughput. In other words, the first throughput may be initially set to a maximum value among settable values.

The plurality of write commands are executed (operation S200). For example, as will be described with reference to FIG. 6, the execution of the plurality of write commands may represent the operation of allocating the plurality of write commands to the plurality of memory blocks (e.g., a resource allocation operation).

The plurality of write command completion responses are transmitted to the external host device based on the first throughput that is set to the initial value (operation S250). For example, as will be described with reference to FIG. 6, the plurality of write command completion responses may be transmitted to the external host device when a delay time elapses after the operation of allocating the plurality of write commands is completed.

A plurality of write data are internally stored based on the plurality of write commands (operation S300). For example, as will be described with reference to FIG. 7, an operation of internally storing the plurality of write data may represent an operation of actually storing the plurality of write data in the plurality of memory blocks.

A second throughput associated with the operation of internally storing the plurality of write data is monitored during a predetermined first time interval (operation S400).

In exemplary embodiments of the inventive concept, as will be described with reference to FIG. 8, after the plurality of write data are stored in the plurality of memory blocks, the second throughput may be monitored by monitoring a reception of a plurality of write done signals representing that an operation of storing the plurality of write data is completed. In exemplary embodiments of the inventive concept, as will be described with reference to FIG. 2, the storage device may further include a buffer memory, and the plurality of write data may be temporarily stored in the buffer memory and then stored in the plurality of memory blocks. In this example, as will be described with reference to FIG. 12, the second throughput may be monitored by monitoring a current usage of the buffer memory. In exemplary embodiments of the inventive concept, the second throughput may be monitored by monitoring at least one of various parameters representing performance of the operation of internally storing the plurality of write data.

The first throughput is selectively changed based on the second throughput that is monitored during the predetermined first time interval (operation S500). For example, as will be described with reference to FIG. 9, when the second throughput is changed, the first throughput may be immediately changed based on the changed second throughput.

Although FIG. 1 illustrates that a process is terminated after operation S500 is performed, the inventive concept is not limited thereto. For example, operation S200 may be performed again based on the first throughput changed or maintained as a result of performing operation S500, and then operations S300, S400, and S500 may be performed again. In other words, operations S200, S300, S400 and S500 may be repeatedly (e.g., regularly at predetermined intervals) performed after the storage device is powered on.

In the method of operating the storage device according to an exemplary embodiment of the inventive concept, the storage device may monitor (e.g., self-monitor) the second throughput associated with the operation of internally storing the plurality of write data by itself, and may control or adjust the first throughput, for transmitting the plurality of write command completion responses to the external host device, based on the monitoring result. The write command completion process from the external host device may be controlled based on the performance monitoring internally performed on the storage device itself. Accordingly, the storage device may have a relatively uniform and improved write quality of service (QoS) latency.

Figure 2:
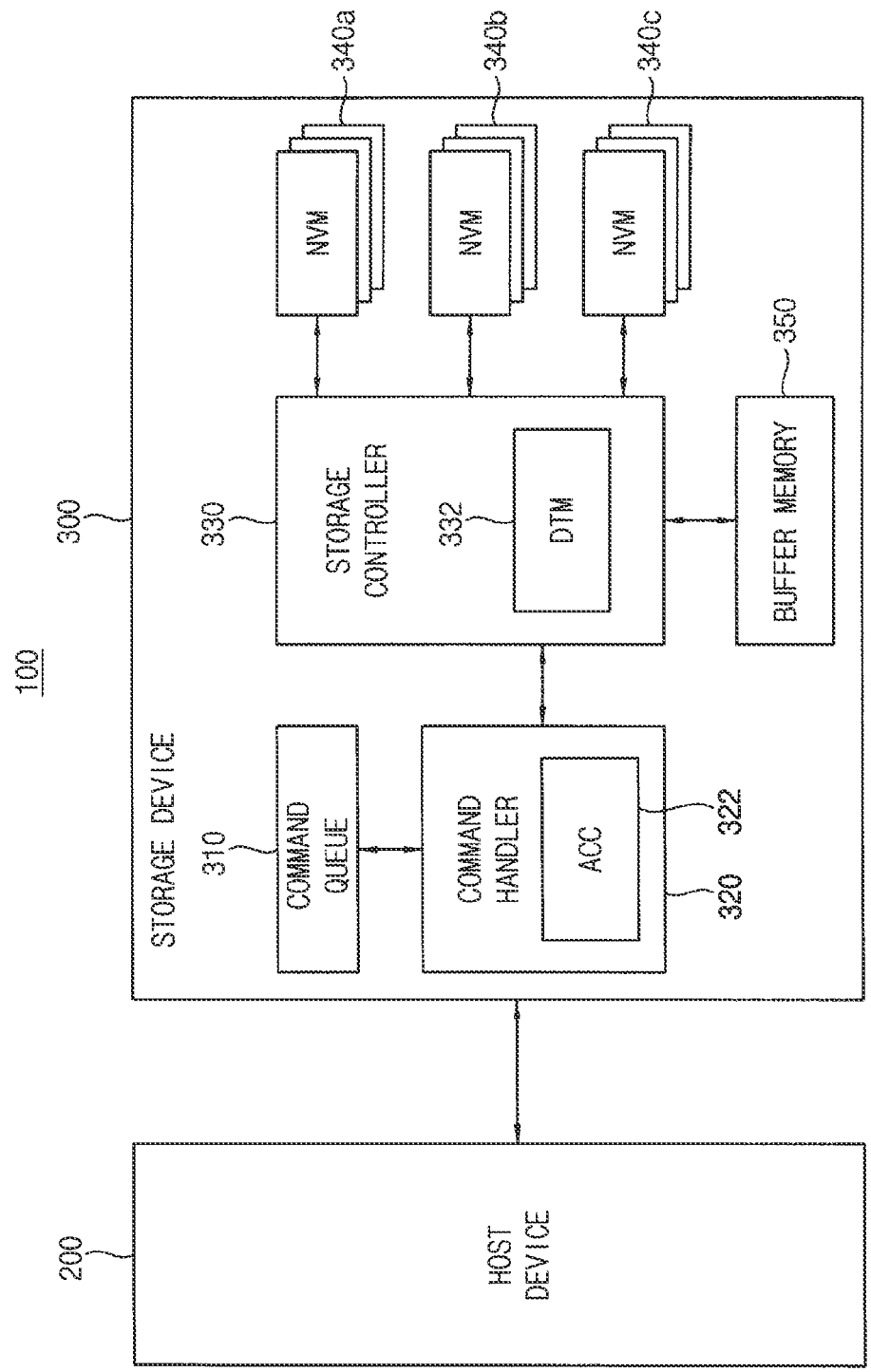
FIG. 2 is a block diagram illustrating a storage device and a storage system including the storage device according to an exemplary embodiment of the inventive concept.

FIG. 2 is a block diagram illustrating a storage device and a storage system including the storage device according to an exemplary embodiment of the inventive concept.

Referring to FIG. 2, a storage system 100 includes a host device 200 and a storage device 300.

The host device 200 controls overall operations of the storage system 100. The host device 200 may include a host processor and a host memory. The host processor may control an operation of the host device 200. For example, the host processor may execute an operating system (OS). The host memory may store instructions and/or data that are executed and/or processed by the host processor. For example, the operating system executed by the host processor may include a file system for file management and a device driver for controlling peripheral devices including the storage device 300 at the operating system level.

The storage device 300 is accessed by the host device 200. The storage device 300 includes a command queue 310, a command handler 320, a storage controller 330, a plurality of nonvolatile memories (NVMs) 340a, 340b and 340c, and a buffer memory 350.

The command queue 310 queues a plurality of commands received from the host device 200. Thus, the storage device 300 may perform asynchronous input and output operations of receiving a new command while the storage device 300 performs an operation based on a previously received command, so that an operating speed of the storage device 300 may be increased. The storage device 300 may be referred to as a queuing device, and hereinafter, exemplary embodiments to be described may be applied to storage devices, e.g., queuing devices, that support a command queue function.

In exemplary embodiments of the inventive concept, the command queue 310 may include a circular buffer or a ring buffer. As described above, the storage device 300 may communicate with the host device 200 using an interface based on a command queue (hereinafter referred to as a command queue based interface). An operation of the command queue based interface may be performed based on a queue pair, including a submission queue for inputting a requested command and a completion queue for recording a processing result of the requested command. The command queue 310 including the circular buffer or the ring buffer may store a pointer that indicates a tail of the submission queue and a pointer that indicates a head of the completion queue.

The command handler 320 executes the plurality of commands queued in the command queue 310. For example, the command handler 320 may generate a resource allocation request for allocating the plurality of commands, and may generate a plurality of command completion responses as a result of executing the plurality of commands (e.g., a result of a resource allocation operation).

The command handler 320 may determine an order of executing the plurality of commands. For example, the command handler 320 may perform an out-of-order scheduling operation, so that the plurality of commands may be executed according to the order determined by the command handler 320, as opposed to an order that the plurality of commands are queued in the command queue 310.

The command handler 320 may include an auto completion controller (ACC) unit 322. The ACC unit 322 may perform an operation of setting and changing the first throughput, an operation of temporarily storing the plurality of command completion responses generated as the result of executing the plurality of commands, etc., that are described with reference to FIG. 1.

The storage controller 330 may control an operation of the storage device 300 and/or operations of the plurality of nonvolatile memories 340a, 340b, and 340c based on a command and data that are received from the host device 200.

The storage controller 330 may include a device throughput monitoring (DTM) unit 332. The DTM unit 332 may perform an operation of monitoring the second throughput that is described with reference to FIG. 1.

In exemplary embodiments of the inventive concept, at least a part of the command queue 310, the command handler 320, the ACC unit 322, and the DTM unit 332 may be implemented as hardware. For example, at least a part of the above-described elements may be included in a computer-based electronic system. In exemplary embodiments of the inventive concept, at least a part of the command queue 310, the command handler 320, the ACC unit 322, and the DTM unit 332 may be implemented as instruction codes or program routines (e.g., a software program). For example, the instruction codes or the program routines may be executed by a computer-based electronic system, and may be stored in any storage device located inside or outside the computer-based electronic system.

The plurality of nonvolatile memories 340a, 340b, and 340c may store the plurality of data. For example, the plurality of nonvolatile memories 340a, 340b, and 340c may store meta data, various user data, or the like.

In exemplary embodiments of the inventive concept, each of the plurality of nonvolatile memories 340a, 340b, and 340c may include a NAND flash memory. In exemplary embodiments of the inventive concept, each of the plurality of nonvolatile memories 340a, 340b and 340c may include one of an electrically erasable programmable read-only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 350 may store instructions and/or data that are executed and/or processed by the storage controller 330, and may temporarily store data stored in or to be stored into the plurality of nonvolatile memories 340a, 340b and 340c. For example, the buffer memory 350 may include at least one of various volatile memories, e.g., a dynamic random access memory (DRAM) or the like.

The command handler 320 and the storage controller 330 perform the method described with reference to FIG. 1. For example, the ACC unit 322 included in the command handler 320 sets the first throughput to the initial value (e.g., the maximum value). The command handler 320 executes the plurality of write commands, and transmits the plurality of write command completion responses to the host device 200 based on the first throughput. The storage controller 330 internally stores the plurality of write data based on the plurality of write commands. The DTM unit 332 included in the storage controller 330 monitors the second throughput during the predetermined first time interval. The ACC unit 322 included in the command handler 320 selectively changes the first throughput based on the second throughput. In other words, the command handler 320 and the storage controller 330 may efficiently control the write command completion process based on the performance monitoring internally performed by themselves. In addition, the command handler 320 and the storage controller 330 may perform a method which will be described with reference to FIG. 14.

In exemplary embodiments of the inventive concept, the storage device 300 may be a solid state drive (SSD). In exemplary embodiments of the inventive concept, the storage device 300 may be one of a universal flash storage (UFS), a multimedia card (MMC), an embedded multimedia card (eMMC), a secure digital (SD) card, a micro SD card, a memory stick, a chip card, a universal serial bus (USB) card, a smart card, a compact flash (CF) card, or the like.

In exemplary embodiments of the inventive concept, the storage device 300 may be connected to the host device 200 via a block accessible interface which may include, for example, a UFS, an eMMC, a serial advanced technology attachment (SATA) bus, a nonvolatile memory express (NVMe) bus, a serial attached small computer system interface (SCSI) (SAS) bus, or the like. The storage device 300 may use a block accessible address space corresponding to an access size of the plurality of nonvolatile memories 340a, 340b and 340c to provide the block accessible interface to the host device 200, for allowing access by units of a memory block with respect to data stored in the plurality of nonvolatile memories 340a, 340b, and 340c.

In exemplary embodiments of the inventive concept, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, drone, etc. In exemplary embodiments of the inventive concept, the storage system 100 may be any computing system, such as a personal computer (PC), a server computer, a data center, a workstation, a digital television, a set-top box, a navigation system, etc.

Figure 3:
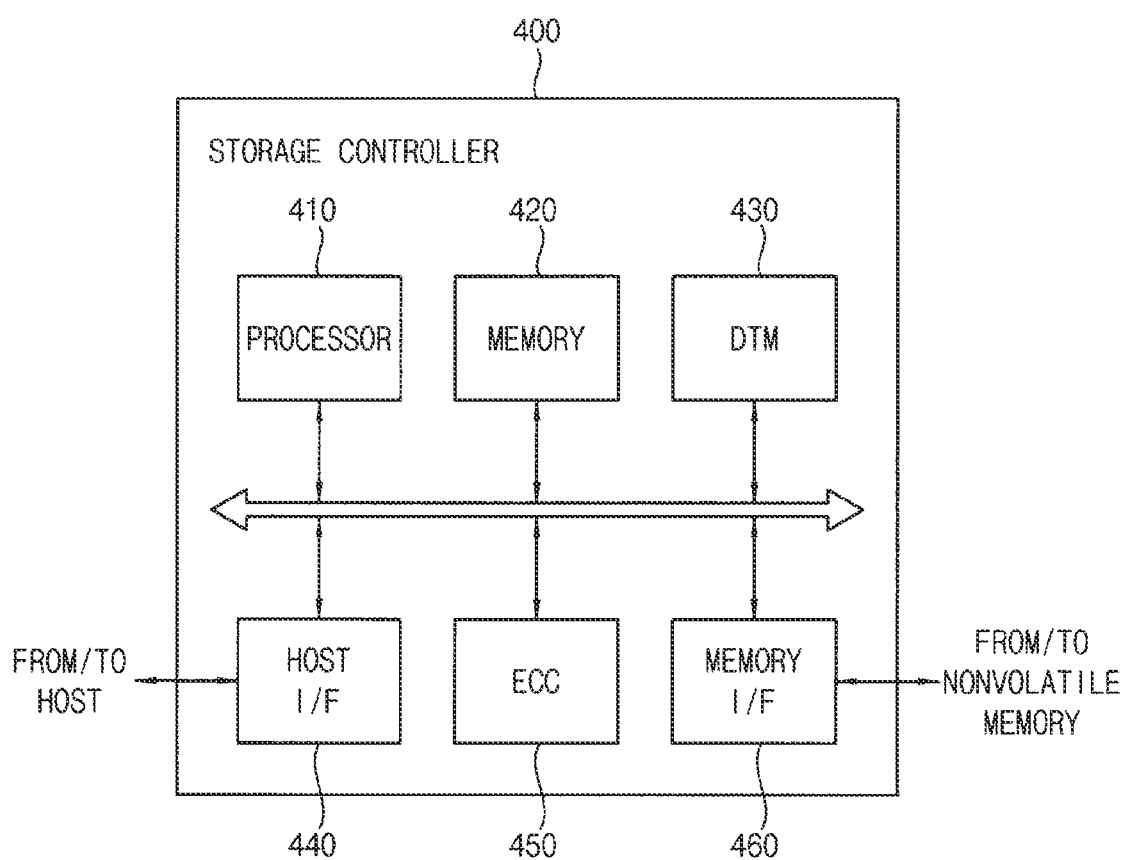
FIG. 3 is a block diagram illustrating a storage controller included in a storage device according to an exemplary embodiment of the inventive concept.

FIG. 3 is a block diagram illustrating a storage controller included in a storage device according to an exemplary embodiment of the inventive concept.

Referring to FIG. 3, a storage controller 400 may include at least one processor 410, a memory 420, a DTM unit 430, a host interface 440, an error correction code (ECC) block 450 for error correction, and a memory interface 460.

The processor 410 may control an operation of the storage controller 400 in response to a command received via the host interface 440 from a host device (e.g., the host device 200 in FIG. 2). In exemplary embodiments of the inventive concept, the processor 410 may control respective components by employing firmware for operating a storage device (e.g., the storage device 300 in FIG. 2).

The memory 420 may store instructions and data executed and processed by the processor 410. For example, the memory 420 may be implemented with a volatile memory device with relatively small capacity and high speed, such as a static random access memory (SRAM), a cache memory, or the like.

The DTM unit 430 that monitors the second throughput associated with the operation of internally storing the plurality of write data may be substantially the same as the DTM unit 332 in FIG. 2.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device 200 and the storage device 300. The host interface 440 may provide an interface corresponding to a bus format of the host for communication between the host device 200 and the storage device 300. In exemplary embodiments of the inventive concept, the bus format of the host device 200 may be a small computer system interface (SCSI) or a serial attached SCSI (SAS) interface. In exemplary embodiments of the inventive concept, the bus format of the host device 200 may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with nonvolatile memories (e.g., the nonvolatile memories 340a, 340b, and 340c in FIG. 2). The memory interface 460 may transfer data to the nonvolatile memories 340a, 340b, and 340c, or may receive data read from the nonvolatile memories 340a, 340b, and 340c. In exemplary embodiments of the inventive concept, the memory interface 460 may be connected to the nonvolatile memories 340a, 340b, and 340c via one channel. In exemplary embodiments of the inventive concept, the memory interface 460 may be connected to the nonvolatile memories 340a, 340b, and 340c via two or more channels.

Figure 4:
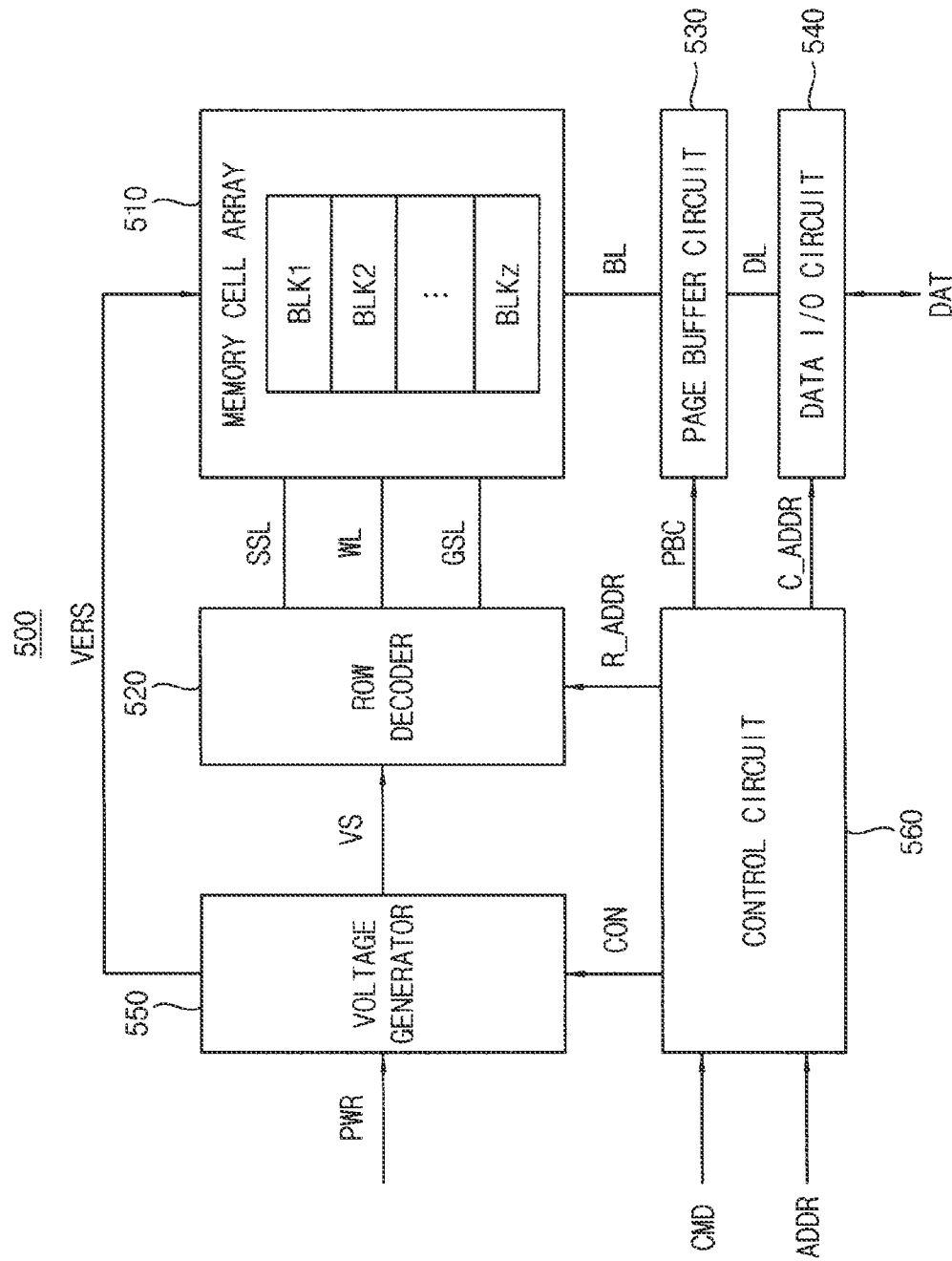
FIG. 4 is a block diagram illustrating a nonvolatile memory included in a storage device according to an exemplary embodiment of the inventive concept.

FIG. 4 is a block diagram illustrating a nonvolatile memory included in a storage device according to an exemplary embodiment of the inventive concept.

Referring to FIG. 4, a nonvolatile memory 500 includes a memory cell array 510, a row decoder 520, a page buffer circuit 530, a data input/output (I/O) circuit 540, a voltage generator 550, and a control circuit 560.

The memory cell array 510 is connected to the row decoder 520 via a plurality of string selection lines SSL, a plurality of wordlines WL, and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In exemplary embodiments of the inventive concept, the plurality of memory cells may be arranged in a two-dimensional (2D) array structure or a three-dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a three-dimensional vertical array structure, in which the three-dimensional memory array is configured as a plurality of levels, with wordlines and/or bitlines shared between levels: U.S. Pat. Nos. 7,679,133, 8,553,466, 8,654, 587, and 8,559,235, and US Pat. Pub. No. 2011/0233648.

The control circuit 560 receives a command CMD and an address ADDR from the outside (e.g., the host device 200 and/or the storage controller 330 in FIG. 2), and controls erasure, programming, and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and a data recover read operation.

For example, the control circuit 560 may generate control signals CON, which are used for controlling the voltage generator 550, and may generate a control signal PBC for controlling the page buffer circuit 530, based on the command CMD. The control circuit 560 may further generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL, and the plurality of ground selection lines GSL.

For example, in the data erase/write/read operations, the row decoder 520 may determine at least one of the plurality of wordlines WL as a selected wordline, and may determine the rest or remainder of the plurality of wordlines WL, other than the selected wordline, as unselected wordlines, based on the row address R_ADDR.

In addition, in the data erase/write/read operations, the row decoder 520 may determine at least one of the plurality of string selection lines SSL as a selected string selection line, and may determine the rest or remainder of the plurality of string selection lines SSL, other than the selected string selection line, as unselected string selection lines, based on the row address R_ADDR.

Further, in the data erase/write/read operations, the row decoder 520 may determine at least one of the plurality of ground selection lines GSL as a selected ground selection line, and may determine the rest or remainder of the plurality of ground selection lines GSL, other than the selected ground selection line, as unselected ground selection lines, based on the row address R_ADDR.

The voltage generator 550 may generate voltages VS for an operation of the nonvolatile memory 500 based on a power PWR and the control signals CON. The voltages VS may be applied to the plurality of string selection lines SSL, the plurality of wordlines WL, and the plurality of ground selection lines GSL via the row decoder 520. In addition, the voltage generator 550 may generate an erase voltage VERS that is required for the data erase operation based on the power PWR and the control signals CON. The erase voltage VERS may be applied to the memory cell array 510 directly or via the bitlines BL.

For example, during the erase operation, the voltage generator 550 may apply the erase voltage VERS to a common source line and/or the bitline BL of a memory block (e.g., a selected memory block), and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recover read operation, the voltage generator 550 may apply the read voltage to a wordline adjacent to the selected wordline and may apply a recover read voltage to the selected wordline via the row decoder 520.

The page buffer circuit 530 may be connected to the memory cell array 510 via the plurality of bitlines BL. The page buffer circuit 530 may include a plurality of page buffers. In exemplary embodiments of the inventive concept, each page buffer may be connected to one bitline. In exemplary embodiments of the inventive concept, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530, or may provide the data DAT from the memory cell array 510 to the outside of the nonvolatile memory 500, based on the column address C_ADDR.

Figure 5:
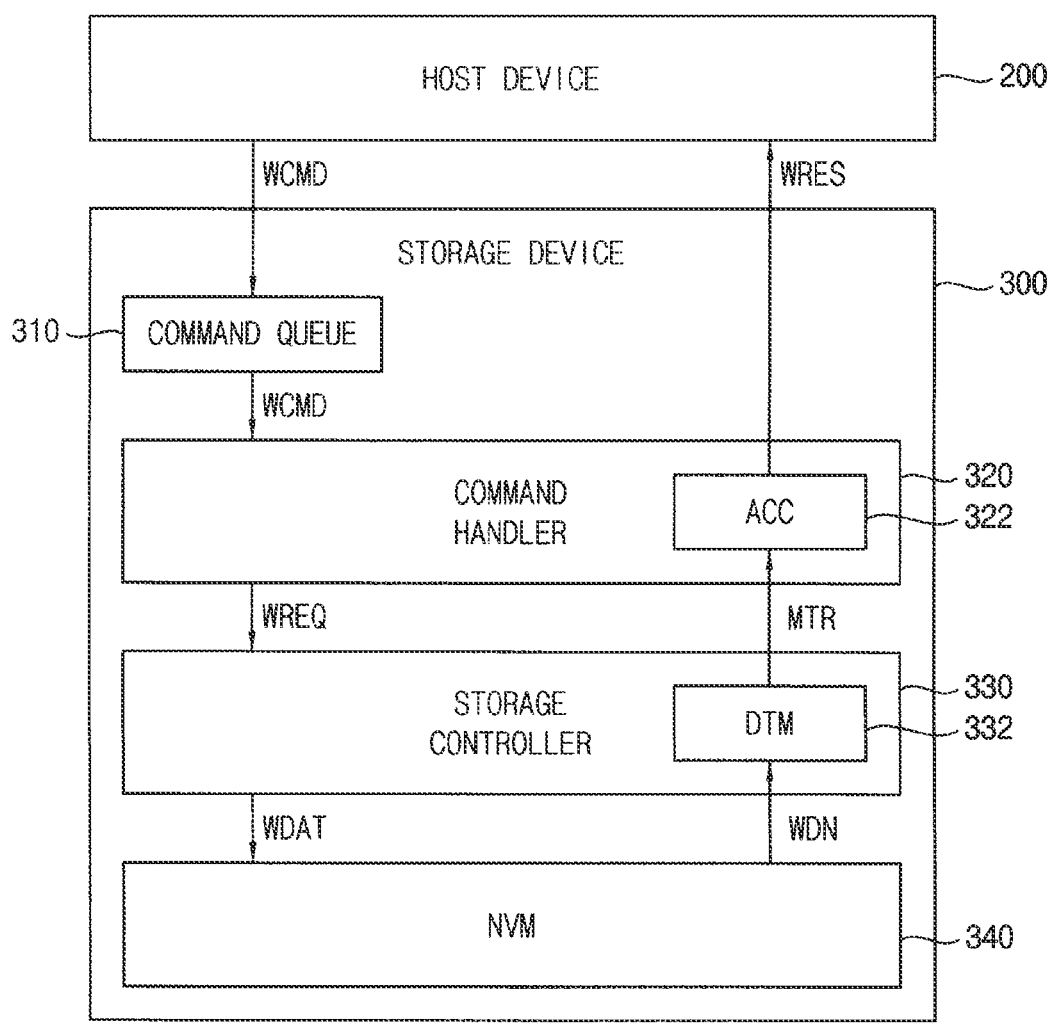
FIG. 5 is a diagram for describing a method of operating a storage device according to an exemplary embodiment of the inventive concept.
Figure 6:
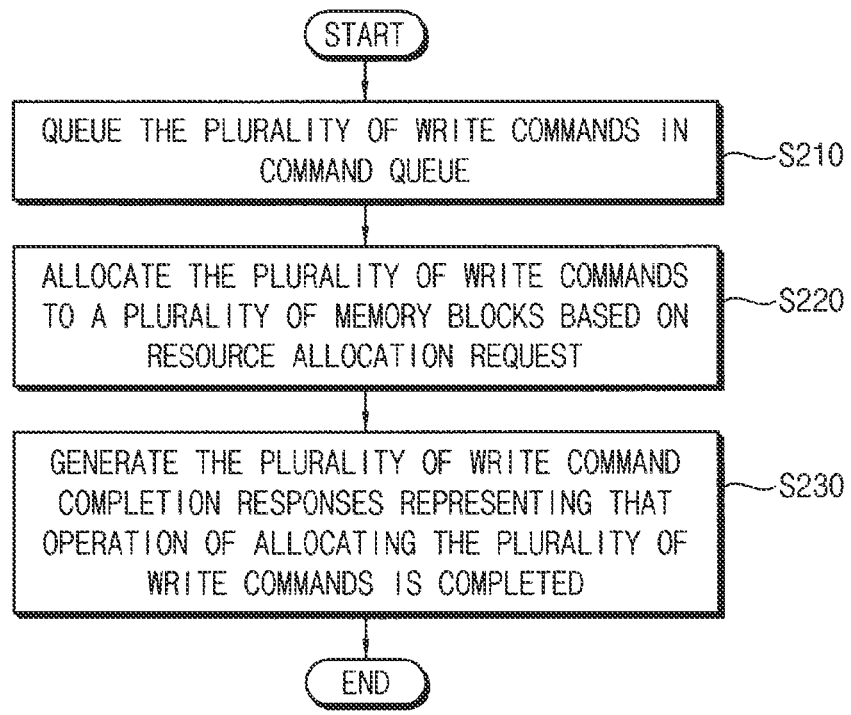
FIG. 6 is a flowchart illustrating an example of executing a plurality of write commands in FIG. 1 according to an exemplary embodiment of the inventive concept.

FIG. 5 is a diagram for describing a method of operating a storage device according to an exemplary embodiment of the inventive concept. FIG. 6 is a flowchart illustrating an example of executing a plurality of write commands in FIG. 1 according to an exemplary embodiment of the inventive concept.

Referring to FIGS. 1, 5, and 6, when executing the plurality of write commands (operation S200), a plurality of write commands WCMD received from the host device 200 may be queued in the command queue 310 (operation S210).

The command handler 320 may determine an order of executing the plurality of write commands WCMD and may generate a resource allocation request WREQ. As described above, the plurality of write commands WCMD may be executed according to the order determined by the command handler 320, rather than an order that the plurality of write commands WCMD are queued in the command queue 310.

The plurality of write commands WCMD may be allocated to a plurality of memory blocks included in a nonvolatile memory 340 based on the resource allocation request WREQ (operation S220). For example, the resource allocation operation may be performed via the storage controller 330. Only the operation of allocating the plurality of write commands WCMD may be performed in operation S220, and an operation of actually storing a plurality of write data WDAT in the plurality of memory blocks may be performed later.

The command handler 320 may generate a plurality of write command completion responses WRES indicating that the operation of allocating the plurality of write commands WCMD is completed (operation S230). The plurality of write command completion responses WRES may be temporarily stored in the ACC unit 322 instead of being transmitted to the host device 200, immediately after the operation of allocating the plurality of write commands WCMD is completed, and may be transmitted to the host device 200 when a delay time elapses after the operation of allocating the plurality of write commands WCMD is completed. For example, the delay time may be determined based on the first throughput in the initial operating time, and then may be determined (e.g., changed or maintained) based on a result of an operation of monitoring the second throughput.

Figure 7:
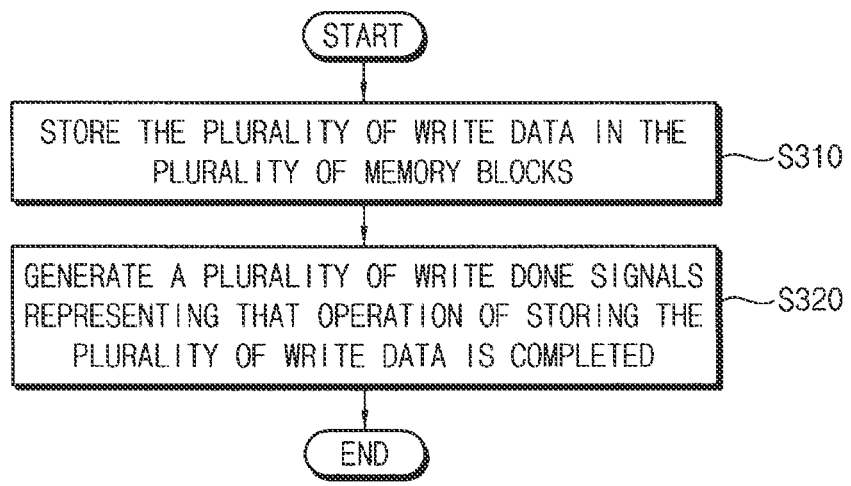
FIG. 7 is a flowchart illustrating an example of internally storing a plurality of write data in FIG. 1 according to an exemplary embodiment of the inventive concept.

FIG. 7 is a flowchart illustrating an example of internally storing a plurality of write data in FIG. 1 according to an exemplary embodiment of the inventive concept. FIG. 8 is a flowchart illustrating an example of monitoring a second throughput during a predetermined first time interval in FIG. 1 according to an exemplary embodiment of the inventive concept.

Referring to FIGS. 1, 5, and 7, when internally storing the plurality of write data (operation S300), the storage controller 330 may store the plurality of write data WDAT in the plurality of memory blocks (operation S310). For example, the plurality of write data WDAT corresponding to the plurality of write commands WCMD may be temporarily stored in the buffer memory 350 in FIG. 2, and may be stored in the plurality of memory blocks included in the nonvolatile memory 340 via the storage controller 330.

The nonvolatile memory 340 may generate a plurality of write done signals WDN indicating that the operation of storing the plurality of write data WDAT is completed (operation S320). The plurality of write done signals WDN may represent an order of completing the operation of storing the plurality of write data WDAT, and may be transmitted to the storage controller 330 and the DTM unit 332 immediately after the operation of storing the plurality of write data WDAT is completed.

Figure 8:
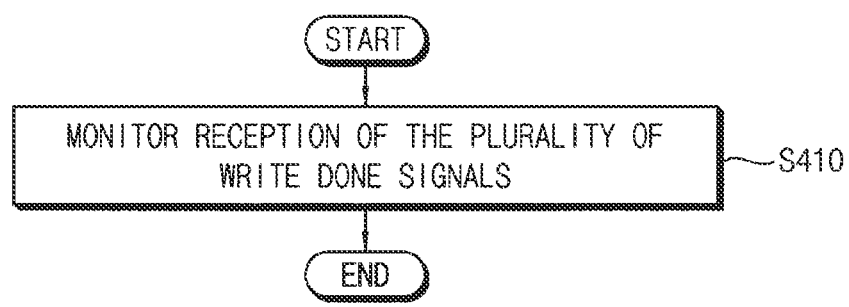
FIG. 8 is a flowchart illustrating an example of monitoring a second throughput during a predetermined first time interval in FIG. 1 according to an exemplary embodiment of the inventive concept.

Referring to FIGS. 1, 5, and 8, when monitoring the second throughput during the predetermined first time interval (operation S400), the DTM unit 332 included in the storage controller 330 may monitor the second throughput by monitoring the reception of the plurality of write done signals WDN (operation S410). The DTM unit 332 may transmit a result MTR of the operation of monitoring the second throughput to the ACC unit 322 included in the command handler 320.

In exemplary embodiments of the inventive concept, the DTM unit 332 may determine that the second throughput increases as the number of the plurality of write done signals WDN received during the predetermined first time interval increases (e.g., the greater the number of write done signals WDN received during the predetermined first time interval, the greater the second throughput). In addition, the DTM unit 332 may determine that the second throughput decreases as the number of the plurality of write done signals WDN received during the predetermined first time interval decreases (e.g., the smaller the number of write done signals WDN received during the predetermined first time interval, the smaller the second throughput).

Figure 9:
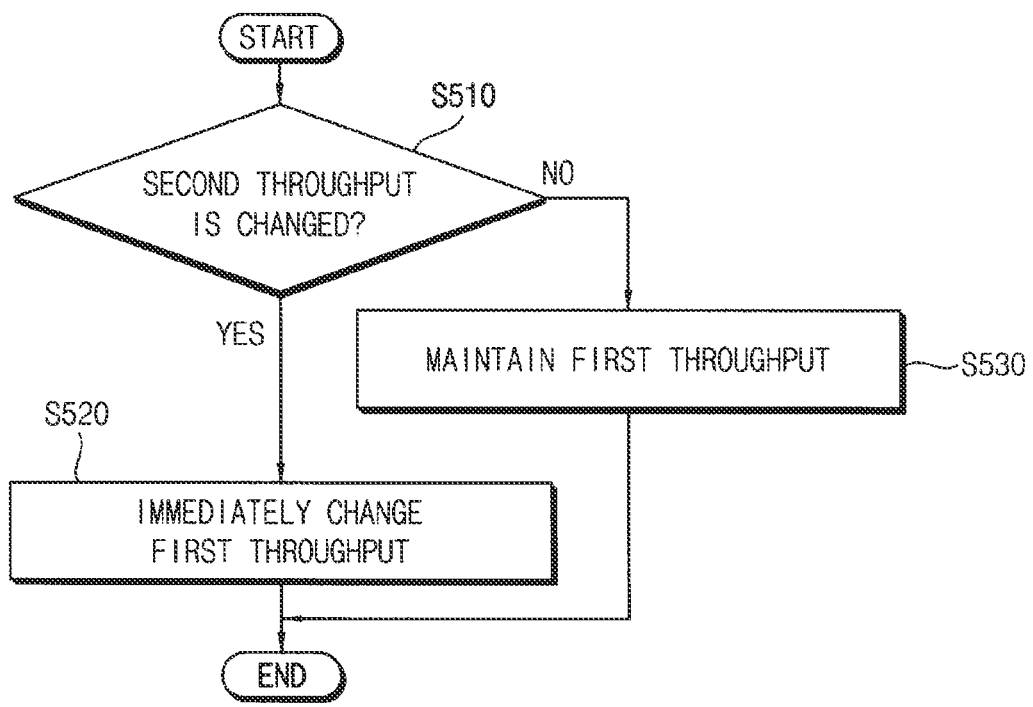
FIGS. 9, 10, and 11 are flowcharts illustrating examples of selectively changing a first throughput based on a second throughput in FIG. 1 according to exemplary embodiments of the inventive concept.
Figure 10:
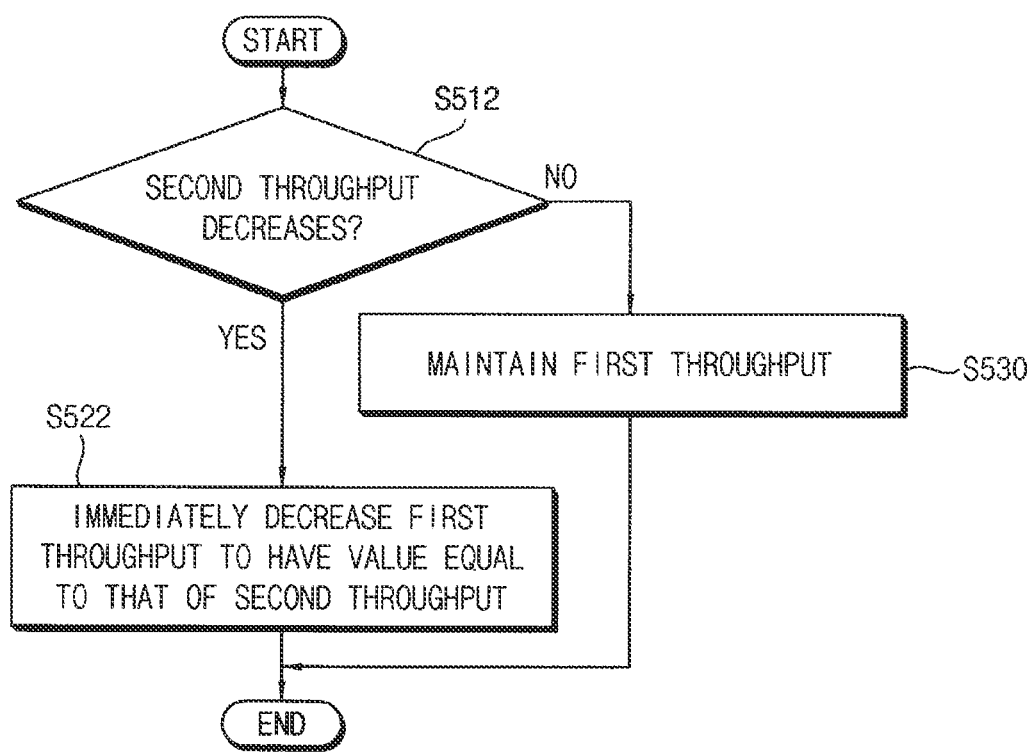
Figure 11:
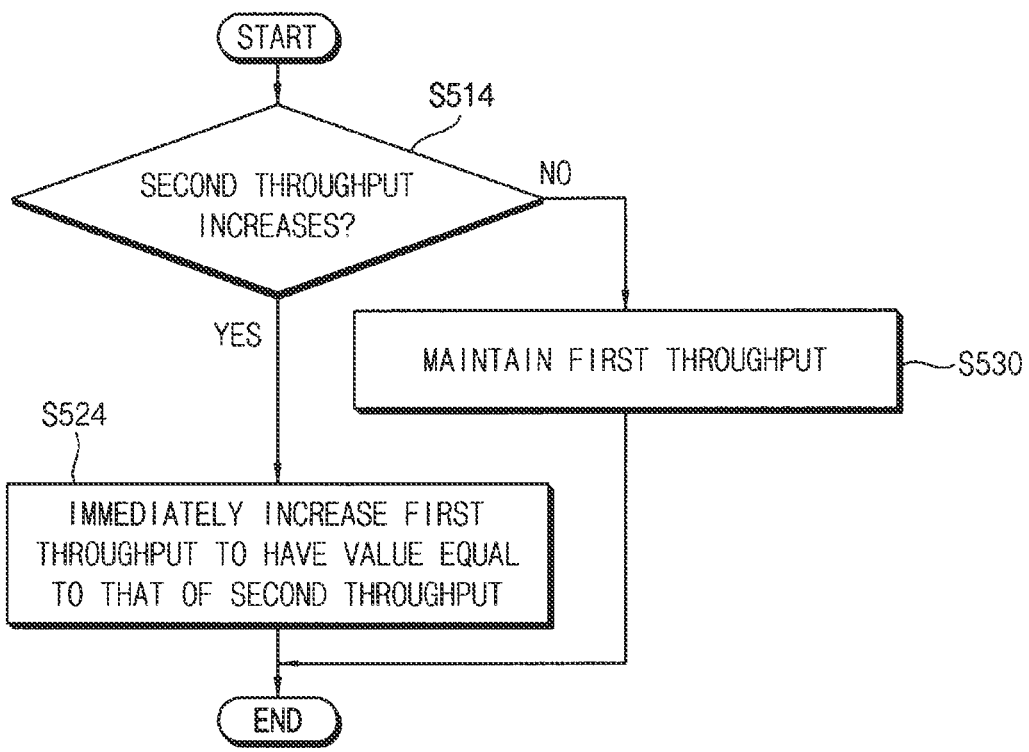

FIGS. 9, 10, and 11 are flowcharts illustrating examples of selectively changing a first throughput based on a second throughput in FIG. 1 according to exemplary embodiments of the inventive concept.

Referring to FIGS. 1, 5, and 9, when selectively changing the first throughput based on the second throughput that is monitored during the predetermined first time interval (operation S500), the ACC unit 322 included in the command handler 320 may check whether the second throughput is changed based on the result MTR of the operation of monitoring the second throughput (operation S510). For example, it may be checked whether the second throughput is substantially equal to or different from the initial value of the first throughput.

When the second throughput is changed (operation S510: YES), the ACC unit 322 may immediately change the first throughput (operation S520). For example, the first throughput may be changed to have the same value as the changed second throughput. In other words, the ACC unit 322 may feed back the monitored second throughput to immediately and directly control and/or adjust the first throughput to match the second throughput.

When the second throughput is not changed (operation S510: NO), the ACC unit 322 may maintain the first throughput (operation S530).

After that, the ACC unit 322 may transmit the plurality of write command completion responses WRES to the host device 200 based on the changed or maintained first throughput.

An operation of controlling the first throughput to match the second throughput may be an operation of matching a first time associated with the write commands WCMD and the write command completion responses WRES with a second time associated with the write data WDAT and the write done signals WDN. The first time may represent a time interval from a time point at which the storage device 300 receives each of the plurality of write commands WCMD from the host device 200 to a time point at which the storage device 300 transmits each of the plurality of write command completion responses WRES to the host device 200, and may be referred to as an average command completion processing time. The second time may represent a time interval from a time point at which the storage controller 330 stores each of the plurality of write data WDAT in the plurality of memory blocks to a time point at which the storage controller 330 receives each of the plurality of write done signals WDN, and may be referred to as an average data storing time.

Thus, the plurality of write command completion responses WRES may not be transmitted to the host device 200 immediately after the operation of allocating the plurality of write commands WCMD is completed, and may be transmitted to the host device 200 when the delay time elapses after the operation of allocating the plurality of write commands WCMD is completed. The delay time may be determined based on the result of the operation of monitoring the second throughput.

Referring to FIG. 10, when selectively changing the first throughput (operation S500), the ACC unit 322 may check whether the second throughput decreases based on the result MTR of the operation of monitoring the second throughput (operation S512). For example, when the first throughput is initially set to the maximum value corresponding to the maximum throughput in operation S100 of FIG. 1, it may be checked whether the second throughput is lower than the maximum throughput.

When it is determined that the second throughput decreases (operation S512: YES), the ACC unit 322 may immediately decrease the first throughput to have a value equal to that of the second throughput (operation S522). When it is determined that the second throughput does not decrease (operation S512: NO), the ACC unit 322 may maintain the first throughput (operation S530).

As described above, automatic write throttling based on the performance monitoring may be effectively implemented by initially setting the first throughput to the maximum throughput and by immediately reducing the first throughput according to the result of monitoring the second throughput.

Referring to FIG. 11, when selectively changing the first throughput (operation S500), after the second throughput decreases and the first throughput decreases in operations S512 and S522 of FIG. 10, the ACC unit 322 may check whether the second throughput increases based on the result MTR of the operation of monitoring the second throughput (operation S514). In other words, the ACC unit 322 may check whether the second throughput increases as well as whether the second throughput decreases.

When it is determined that the second throughput increases (operation S514: YES), the ACC unit 322 may immediately increase the first throughput to have a value equal to that of the second throughput (operation S524). When it is determined that the second throughput does not increase (operation S514: NO), the ACC unit 322 may maintain the first throughput (operation S530).

Figure 12:
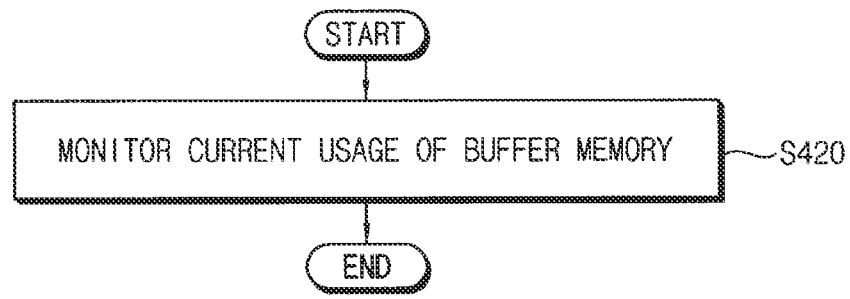
FIG. 12 is a flowchart illustrating an example of monitoring a second throughput during a predetermined first time interval in FIG. 1 according to an exemplary embodiment of the inventive concept.
Figure 13A:
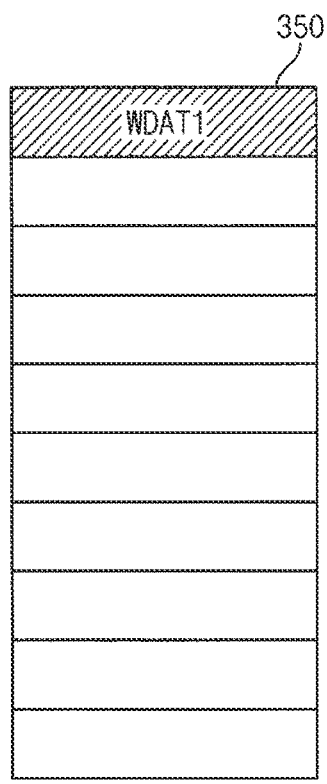
FIGS. 13A and 13B are diagrams for describing an operation of FIG. 12 according to exemplary embodiments of the inventive concept.
Figure 13B:
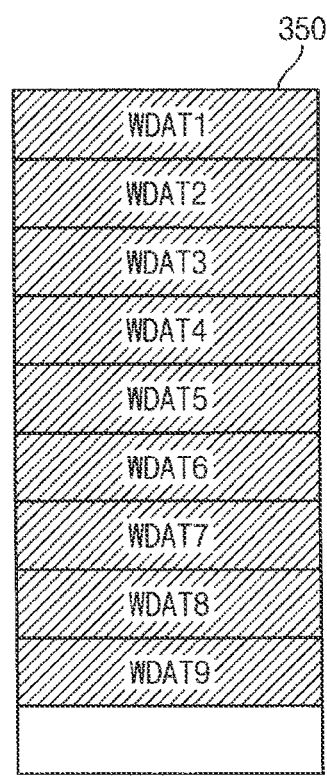

FIG. 12 is a flowchart illustrating an example of monitoring a second throughput during a predetermined first time interval in FIG. 1 according to an exemplary embodiment of the inventive concept. FIGS. 13A and 13B are diagrams for describing an operation of FIG. 12 according to exemplary embodiments of the inventive concept.

Referring to FIGS. 1, 5, 12, 13A, and 13B, when monitoring the second throughput during the predetermined first time interval (operation S400), the plurality of write data WDAT may be temporarily stored in the buffer memory 350, and then may be stored in the plurality of memory blocks in operation S300 of FIG. 1. In this example, the DTM unit 332 included in the storage controller 330 may monitor the second throughput by monitoring a current usage of the buffer memory 350 (operation S420).

In exemplary embodiments of the inventive concept, the DTM unit 332 may determine that the second throughput increases as the current usage of the buffer memory 350 (or the quantity of the buffer memory 350 currently used) decreases during the predetermined first time interval (e.g., the smaller the current usage of the buffer memory 350 during the predetermined first time interval, the greater the second throughput). As illustrated in FIG. 13A, when the plurality of write data WDAT are provided to the buffer memory 350 during the predetermined first time interval, but when only some write data WDAT1 is still stored in the buffer memory 350 so that the current usage of the buffer memory 350 is relatively small, the DTM unit 332 may determine that the remaining write data other than the write data WDAT1, among the plurality of write data WDAT provided to the buffer memory 350 during the predetermined first time interval, are stored in the plurality of memory blocks. Thus, it may be determined that the second throughput associated with the operation of internally storing the plurality of write data WDAT is relatively large.

In exemplary embodiments of the inventive concept, the DTM unit 332 may determine that the second throughput decreases as the current usage of the buffer memory 350 increases during the predetermined first time interval (e.g., the greater the current usage of the buffer memory 350 during the predetermined first time interval, the smaller the second throughput). As illustrated in FIG. 13B, when the plurality of write data WDAT are provided to the buffer memory 350 during the predetermined first time interval, and when most of write data WDAT1, WDAT2, WDAT3, WDAT4, WDAT5, WDAT6, WDAT7, WDAT8, and WDAT9 are still stored in the buffer memory 350 so that the current usage of the buffer memory 350 is relatively large, the DTM unit 332 may determine that only some write data other than the write data WDAT1~WDAT9, among the plurality of write data WDAT provided to the buffer memory 350 during the predetermined first time interval, are stored in the plurality of memory blocks. Thus, it may be determined that the second throughput associated with the operation of internally storing the plurality of write data WDAT is relatively small.

Although FIGS. 8 and 12 illustrate examples where the second throughput is monitored by monitoring the reception of the plurality of write done signals WDN or by monitoring the current usage of the buffer memory 350, the inventive concept is not limited thereto. For example, the second throughput may be monitored by monitoring at least one of various parameters representing performance of the operation of internally storing the plurality of write data WDAT.

Figure 14:
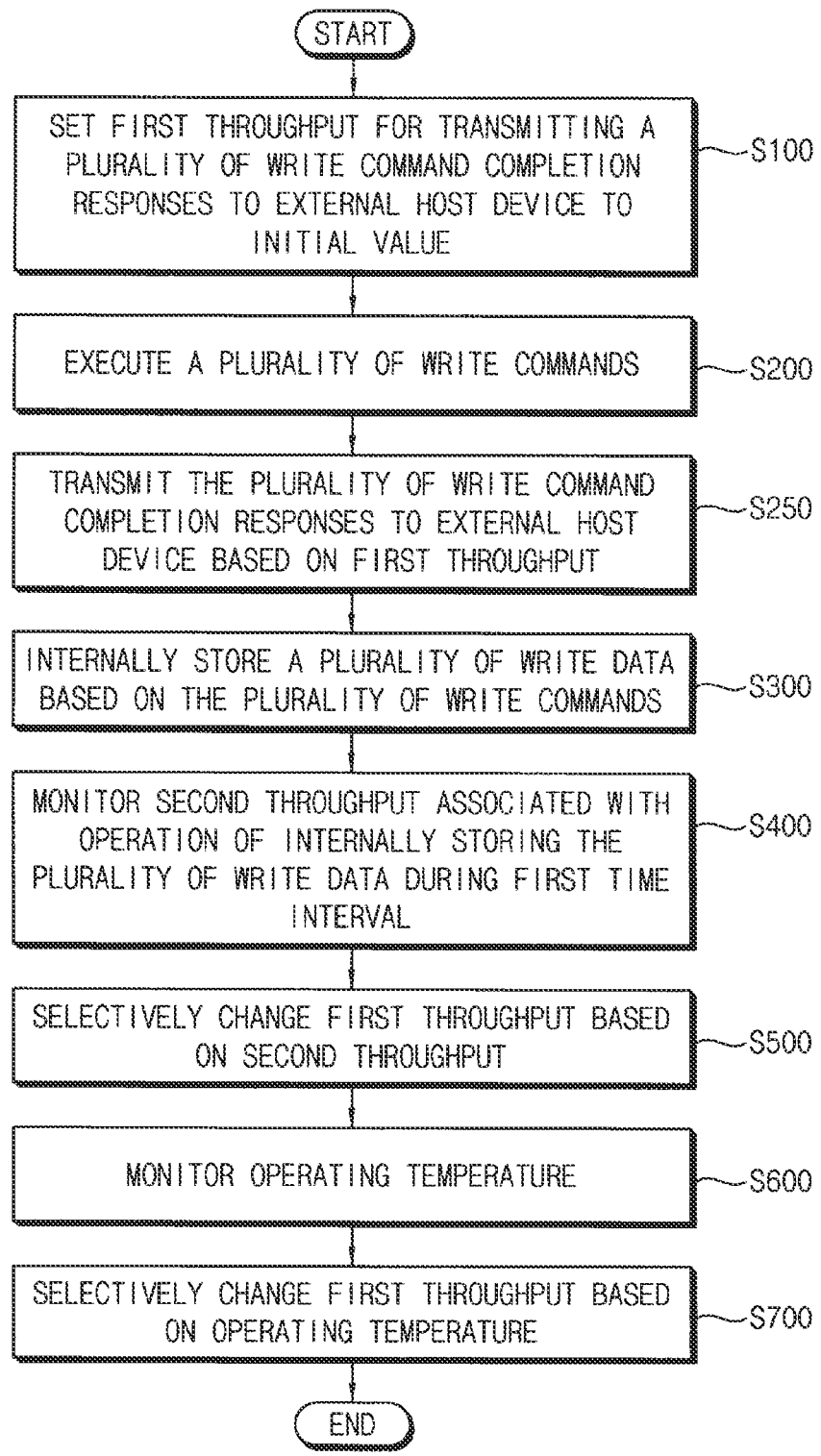
FIG. 14 is a flowchart illustrating a method of operating a storage device according to an exemplary embodiment of the inventive concept.

FIG. 14 is a flowchart illustrating a method of operating a storage device according to an exemplary embodiment of the inventive concept. Descriptions of elements already described with reference to FIG. 1 will be omitted.

Referring to FIG. 14, in a method of operating a storage device according to an exemplary embodiment of the inventive concept, operations S100, S200, S300, S400 and S500 in FIG. 14 may be substantially the same as operations S100, S200, S300, S400, and S500 in FIG. 1, respectively.

An operating temperature of the storage device may be monitored (operation S600), and the first throughput is selectively changed based on the monitored operating temperature (operation S700). In an example of FIG. 14, the first throughput may be changed based on the operating temperature as well as the second throughput.

Although FIG. 14 illustrates an example where operations S600 and S700 are performed after operations S400 and S500 are performed, the inventive concept is not limited thereto, and operations S400 and S500 and operations S600 and S700 may be performed substantially simultaneously and/or alternately.

Figure 15:
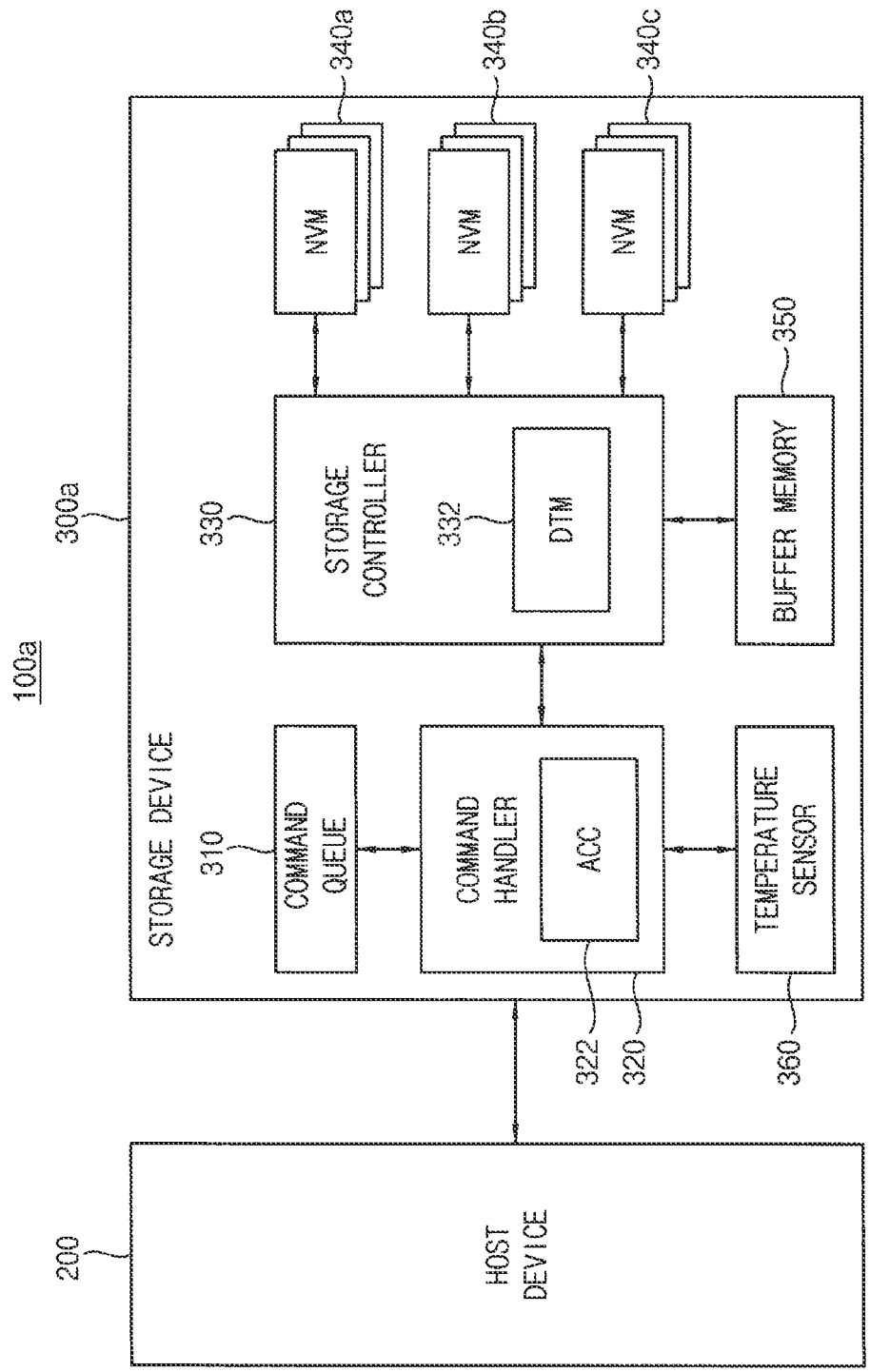
FIG. 15 is a block diagram illustrating a storage device and a storage system including the storage device according to an exemplary embodiment of the inventive concept.

FIG. 15 is a block diagram illustrating a storage device and a storage system including the storage device according to an exemplary embodiment of the inventive concept. Descriptions of elements already described with reference to FIG. 2 will be omitted.

Referring to FIG. 15, a storage system 100a includes the host device 200 and a storage device 300a.

The storage system 100a of FIG. 15 may be substantially the same as the storage system 100 of FIG. 2, except that the storage device 300a in FIG. 15 further includes a temperature sensor 360.

The temperature sensor 360 may monitor an operating temperature of the storage device 300a, and may provide the monitoring result to the command handler 320 and the ACC unit 322 included therein. For example, the temperature sensor 360 may be formed separately from the command queue 310, the command handler 320, the storage controller 330, the plurality of nonvolatile memories 340a, 340b, and 340c, and the buffer memory 350, and may be mounted on a printed circuit board (PCB). As another example, the temperature sensor 360 may be included in at least one of the command queue 310, the command handler 320, the storage controller 330, the plurality of nonvolatile memories 340a, 340b and 340c, and the buffer memory 350, and may be an on-chip sensor (or on-die sensor) that includes an on-chip metal resistor.

Figure 16:
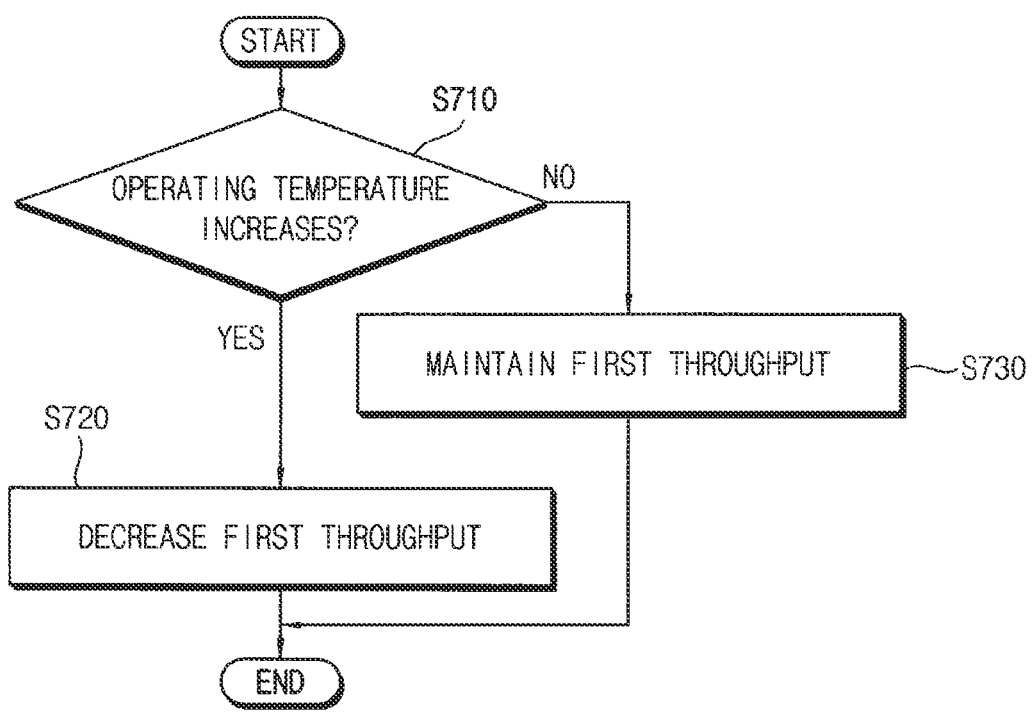
FIG. 16 is a flowchart illustrating an example of selectively changing a first throughput based on an operating temperature in FIG. 14 according to an exemplary embodiment of the inventive concept.

FIG. 16 is a flowchart illustrating an example of selectively changing a first throughput based on an operating temperature in FIG. 14 according to an exemplary embodiment of the inventive concept.

Referring to FIGS. 14, 15, and 16, when selectively changing the first throughput based on the monitored operating temperature (operation S700), the ACC unit 322 included in the command handler 320 may determine whether the operating temperature is changed based on the temperature sensor 360 (operation S710), and may change the first throughput when the operating temperature is changed.

For example, when the operating temperature increases (operation S710: YES), the ACC unit 322 may decrease the first throughput (operation S720). When the operating temperature does not increase (operation S710: NO), the ACC unit 322 may maintain the first throughput (operation S730).

As described above, automatic write throttling may be effectively implemented by immediately reducing the first throughput according to the result of monitoring the operating temperature. In particular, an operation of reducing the first throughput on a temperature basis may be referred to as dynamic thermal throttling (DTT).

After the operating temperature increases and the first throughput decreases in operations S710 and S720 of FIG. 16, the ACC unit 322 may check whether the operating temperature decreases based on the temperature sensor 360, and may increase the first throughput when the operating temperature decreases. In other words, it may be check whether the operating temperature decreases as well as whether the operating temperature increases.

Although the examples where the automatic write throttling is implemented by monitoring the second throughput or by monitoring the operating temperature have been described, the inventive concept is not limited thereto, and the automatic write throttling may be implemented by monitoring at least one of various operating parameters associated with the performance of the storage device.

Figure 17:
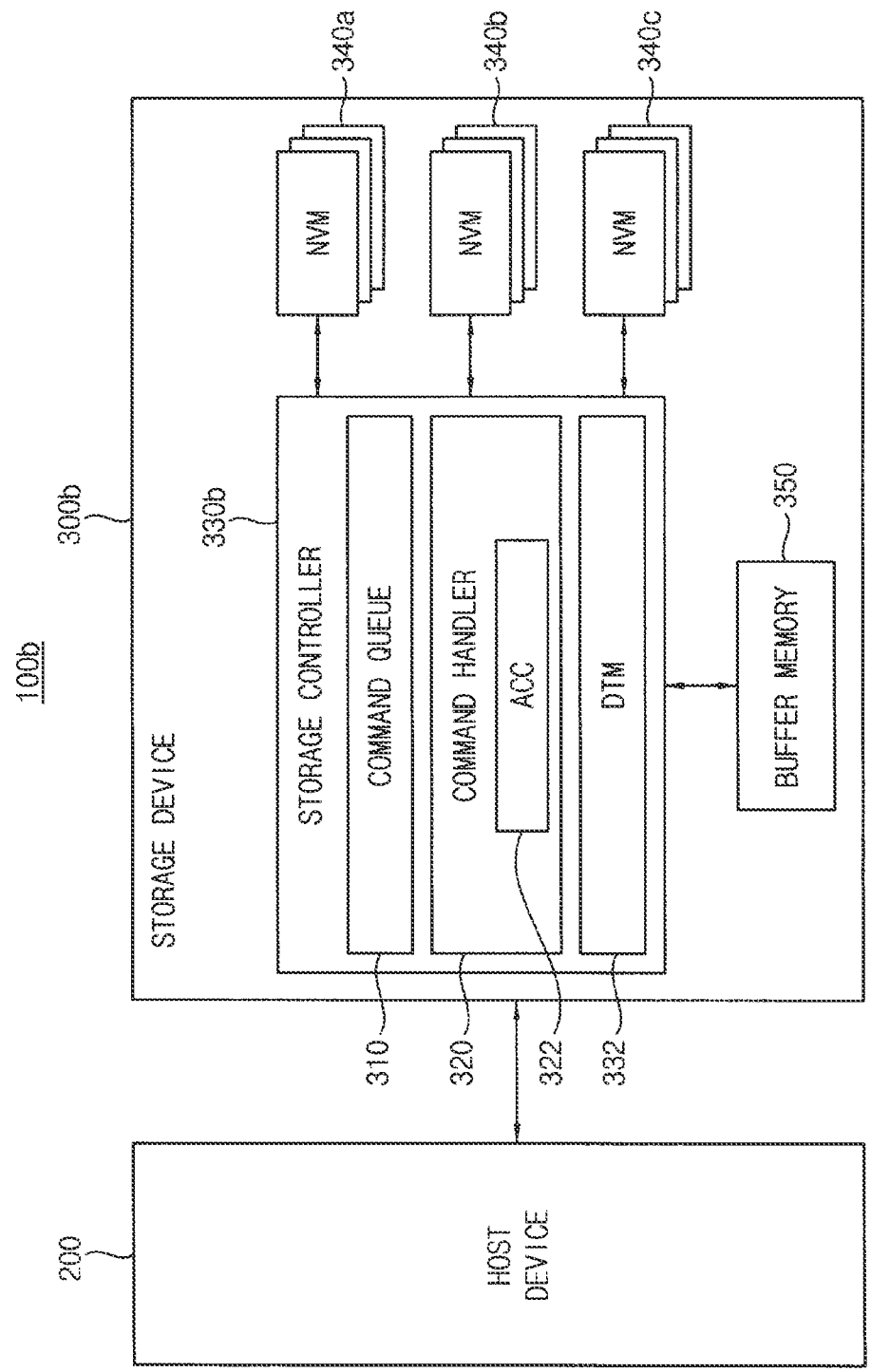
FIG. 17 is a block diagram illustrating a storage device and a storage system including the storage device according to an exemplary embodiment of the inventive concept.

FIG. 17 is a block diagram illustrating a storage device and a storage system including the storage device according to an exemplary embodiment of the inventive concept. Descriptions of elements already described with reference to FIG. 2 will be omitted.

Referring to FIG. 17, a storage system 100b includes the host device 200 and a storage device 300b.

The storage system 100b of FIG. 17 may be substantially the same as the storage system 100 of FIG. 2, except that the command queue 310 and the command handler 320 in the storage device 300b are included in a storage controller 330b in FIG. 17.

In exemplary embodiments of the inventive concept, only one of the command queue 310 and the command handler 320 may be included in the storage controller 330b, and/or the storage device 300b may further include the temperature sensor 360 as illustrated in FIG. 15.

Although examples of processing write commands have been described, the inventive concept is not limited thereto. For example, exemplary embodiments of the inventive concept may be extended such that a first throughput for transmitting command completion responses representing an execution of tasks based on any commands may be set to an initial value, the commands and/or tasks may be executed, the command completion responses may be transmitted to the host device based on the first throughput that is set to the initial value, a memory access operation based on the commands and/or tasks may be performed, a second throughput associated with the memory access operation may be monitored during a first predetermined time interval, and the first throughput may be changed based on the second throughput that is monitored during the predetermined first time interval.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 18:
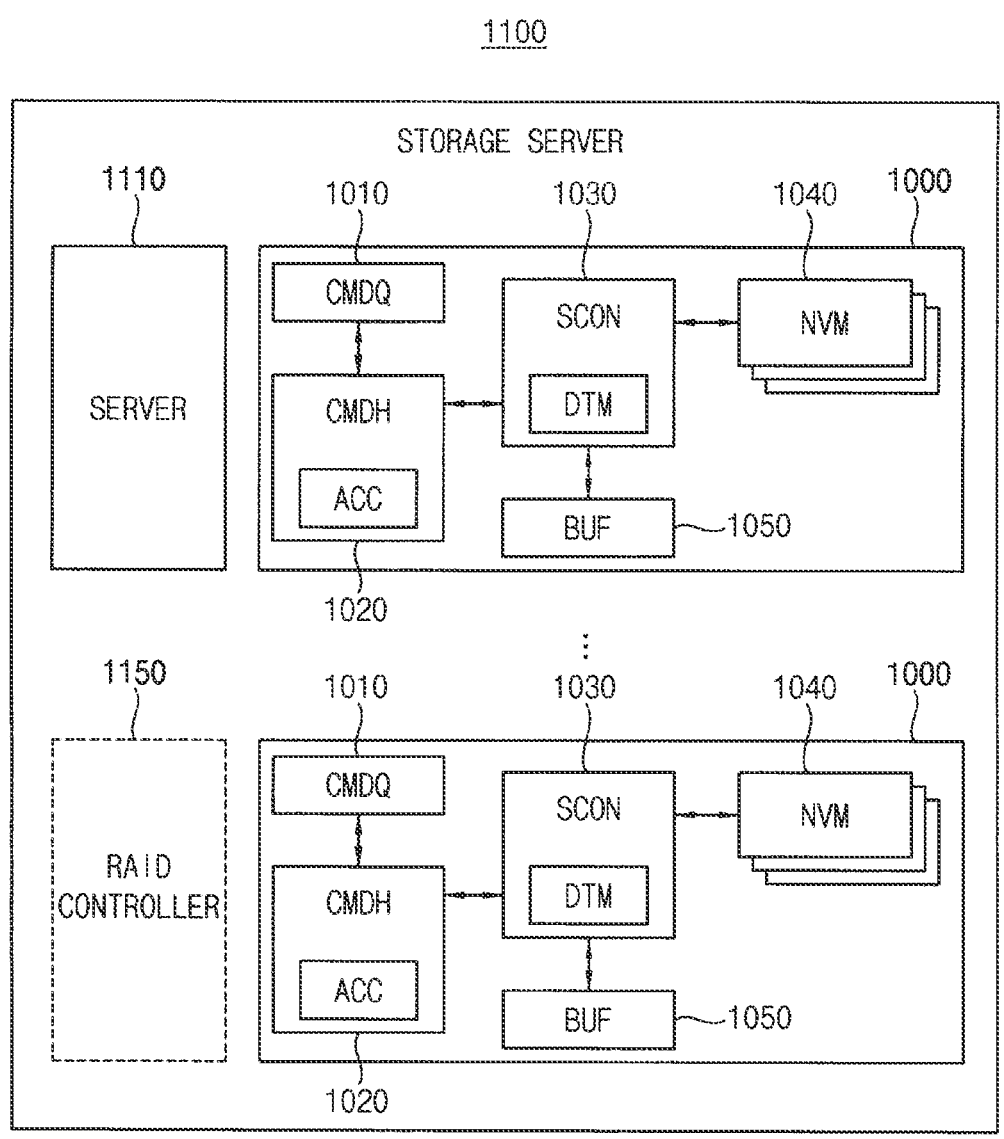
FIG. 18 is a block diagram illustrating a storage server including a storage device according to an exemplary embodiment of the inventive concept.

FIG. 18 is a block diagram illustrating a storage server including a storage device according to an exemplary embodiment of the inventive concept.

Referring to FIG. 18, a storage server 1100 may include a server 1110, a plurality of storage devices 1000 which store data for operating the server 1110, and a redundant array of independent drives (RAID) controller 1150 for controlling the plurality of storage devices 1000.

RAID techniques are mainly used in data servers where important data can be replicated in more than one location across a plurality a plurality of storage devices. The RAID controller 1150 may enable one of a plurality of RAID levels according to RAID information, and may interface data between the server 1110 and the plurality of storage devices 1000.

Each of the plurality of storage devices 1000 may include a command queue (CMDQ) 1010, a command handler (CMDH) 1020, a storage controller (SCON) 1030, a plurality of nonvolatile memories 1040, and a buffer memory (BUF) 1050. Each of the plurality of storage devices 1000 may correspond to the storage device 300 according to exemplary embodiments of the inventive concept, and may operate according to exemplary embodiments of the inventive concept described above with reference to FIGS. 1 through 17. The server 1110 may correspond to the host device 200, and may control the plurality of storage devices 1000.

The inventive concept may be applied to various electronic devices and/or systems including the storage device and the storage system. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

As described above, in the method of operating the storage device and the storage device according to exemplary embodiments of the inventive concept, the storage device may monitor (e.g., self-monitor) the second throughput associated with the operation of internally storing the plurality of write data by itself, and may control or adjust the first throughput, for transmitting the plurality of write command completion responses to the external host device, based on the monitoring result. The write command completion process from the external host device may be controlled based on the performance monitoring internally performed on the storage device by itself. Accordingly, the storage device may have a relatively uniform and improved write quality of service (QoS) latency.

For example, the automatic write throttling based on the performance monitoring may be effectively implemented by initially setting the first throughput to the maximum throughput and by immediately reducing the first throughput according to the result of monitoring the second throughput.

While the inventive concept has been shown and described with reference to exemplary embodiments thereof, it will be understood by those of ordinary skill in the art that various modifications in form and details may be made thereto without departing from the spirit and scope of the inventive concept as set forth by the appended claims.

What is claimed is:

1. A storage device comprising:
a plurality of nonvolatile memories;
a command queue circuit configured to queue a plurality of commands received from an external device, the plurality of commands including a plurality of write commands;
a command handler circuit configured to execute the plurality of commands to generate a plurality of command completion responses, and to set a first throughput, for transmitting a plurality of write command completion responses to the external device, to a first value, the plurality of command completion responses including the plurality of write command completion responses;
a controller configured to monitor a second throughput associated with an operation of internally storing a plurality of write data during a first time interval; and
a temperature sensor configured to monitor a temperature of the storage device, and to provide the temperature to the command handler circuit, wherein the command handler circuit is configured to change the first throughput based on the second throughput and/or the temperature,
when the first throughput is changed based on the second throughput, the command handler circuit is configured to change the first throughput by decreasing the first throughput when it is determined that the second throughput is reduced from a maximum throughput as a result of monitoring the second throughput, wherein the first throughput decreases to have a value equal to that of the second throughput,
the command handler circuit is configured to execute the plurality of write commands, and to transmit the plurality of write command completion responses to the external device based on the first throughput, and
the controller is configured to store the plurality of write data to the plurality of nonvolatile memories based on the plurality of write commands.

2. The storage device of claim 1, wherein the command handler circuit determines an order of executing the plurality of commands.

3. The storage device of claim 2, wherein the command handler circuit performs a scheduling operation to determine the order of executing the plurality of commands.

4. The storage device of claim 1, wherein the first value is a maximum value.

5. The storage device of claim 1, wherein a value of the second throughput is lower than the first value.

6. The storage device of claim 1, further comprising a buffer memory configured to temporarily store the plurality of write data.

7. The storage device of claim 6, wherein the controller monitors the second throughput by monitoring a current usage of the buffer memory.

8. A storage device comprising:
a plurality of nonvolatile memories;
a command queue circuit configured to queue a plurality of write commands received from an external device;
a command handler circuit configured to execute the plurality of write commands to generate a plurality of write command completion responses, and to set a first throughput, for transmitting the plurality of write command completion responses to the external device, to a first value; and
a controller configured to monitor a second throughput associated with an operation of internally storing a plurality of write data during a first time interval,
wherein the command handler circuit is configured either to change the first throughput or maintain the first throughput, based on the second throughput,
when the first throughput is changed based on the second throughput, the command handler circuit is configured to change the first throughput by decreasing the first throughput when it is determined that the second throughput is reduced from a maximum throughput as a result of monitoring the second throughput, wherein the first throughput decreases to have a value equal to that of the second throughput,
the command handler circuit is configured to execute the plurality of write commands, and to transmit the plurality of write command completion responses to the external device based on the first throughput, and
the controller is configured to store the plurality of write data to the plurality of nonvolatile memories based on the plurality of write commands.

9. The storage device of claim 8, further comprising a temperature sensor configured to monitor a temperature of the storage device, and to provide the temperature to the command handler circuit.

10. The storage device of claim 9, wherein the command handler circuit is configured either to change the first throughput or maintain the first throughput, based on the temperature.

11. The storage device of claim 8, wherein the first value is a maximum value.

12. The storage device of claim 8, wherein a value of the second throughput is lower than the first value.

13. The storage device of claim 8, further comprising a buffer memory configured to temporarily store the plurality of write data,
wherein the controller monitors the second throughput by monitoring a current usage of the buffer memory.

14. A storage device comprising:
a plurality of nonvolatile memories;
a command queue circuit configured to queue a plurality of commands received from an external device, the plurality of commands including a plurality of write commands;
a command handler circuit configured to execute the plurality of commands to generate a plurality of command completion responses, and to set a first throughput, for transmitting a plurality of write command completion responses to the external device, to a maximum value, the plurality of command completion responses including the plurality of write command completion responses;
a controller configured to monitor a second throughput associated with an operation of internally storing a plurality of write data during a first time interval; and
a temperature sensor configured to monitor a temperature of the storage device, and to provide the temperature to the command handler circuit,
wherein the command handler circuit is configured either to change the first throughput or maintain the first throughput, based on the second throughput and/or the temperature,
when the first throughput is changed based on the second throughput, the command handler circuit is configured to change the first throughput by decreasing the first throughput when it is determined that the second throughput is reduced from a maximum throughput as a result of monitoring the second throughput, wherein the first throughput decreases to have a value equal to that of the second throughput,
the command handler circuit is configured to execute the plurality of write commands, and to transmit the plurality of write command completion responses to the external device based on the first throughput, and
the controller is configured to store the plurality of write data to the plurality of nonvolatile memories based on the plurality of write commands.

15. The storage device of claim 14, wherein a value of the second throughput is lower than the maximum value.

* * * * *